Oct. 10, 1933.                C. H. WILLIS                1,929,720
                    ELECTRIC POWER CONVERTING APPARATUS
                           Filed March 11, 1931
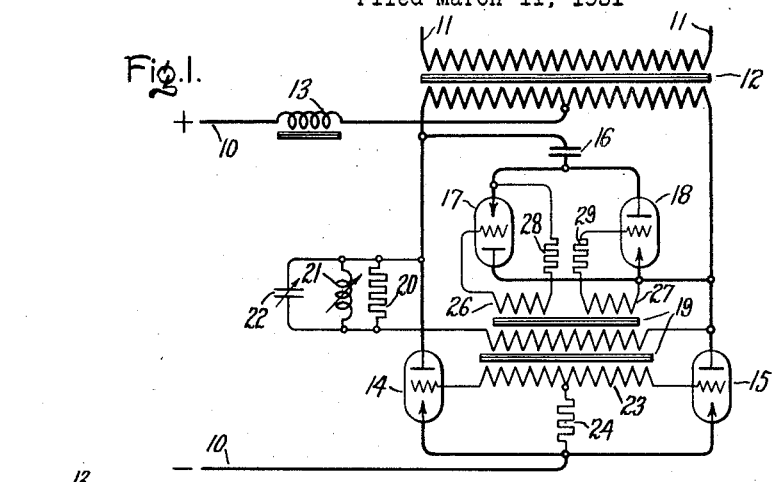
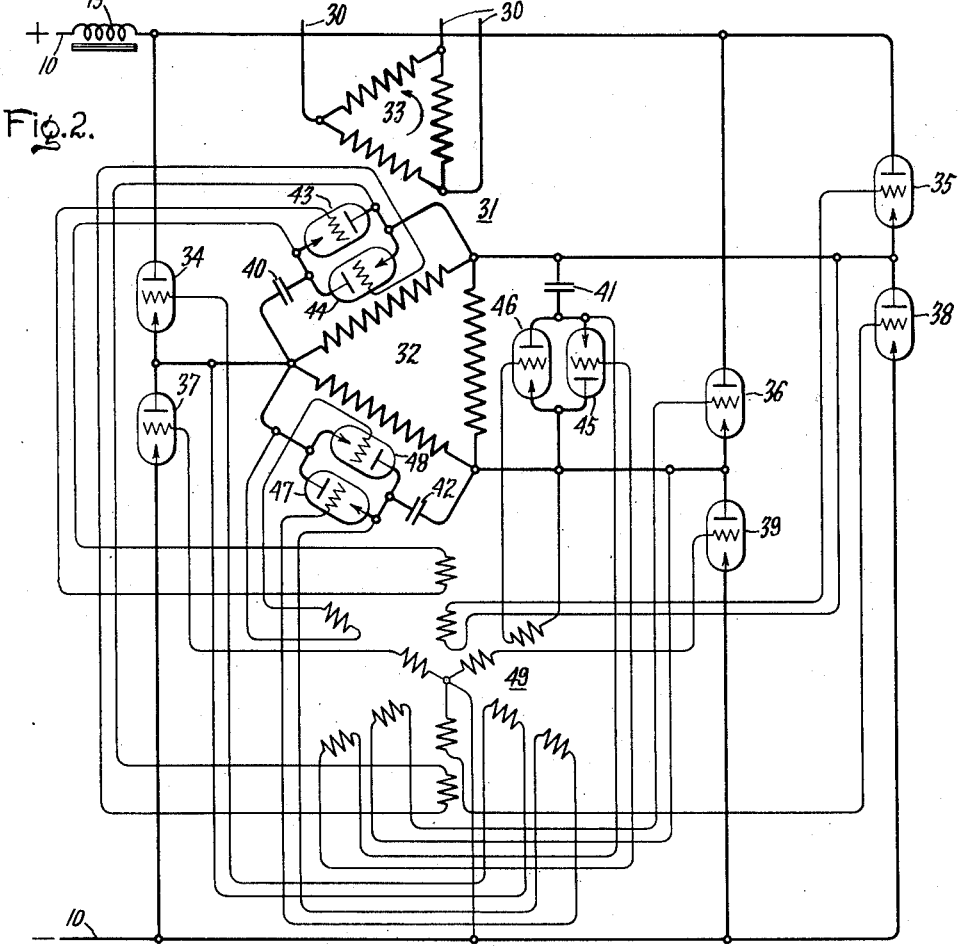
Inventor:
Clodius H. Willis,
by Charles V. Tullar
His Attorney.

Patented Oct. 10, 1933

1,929,720

UNITED STATES PATENT OFFICE 1,929,720

ELECTRIC POWER CONVERTING APPARATUS

Clodius H. Willis, Schenectady, N. Y., assignor to General Electric Company, a corporation of New York Application March 11, 1931. Serial No. 521,801

13 Claims. (Cl. 175—363)

My invention relates to electric power converting apparatus and more particularly to such apparatus including electric valves and adapted to transmit energy from a direct current supply circuit to an alternating current load circuit.

Heretofore, there have been devised numerous apparatus for transmitting energy from a direct current supply circuit to an alternating current load circuit by the use of electric valves. One type of such apparatus, known in the art as the parallel inverter, has found particular favor because of its stability and high apparatus efficiency. An example of this latter type of apparatus is disclosed in United States Letters Patent No. 1,800,002, granted April 7, 1931, upon the application of Ernst F. W. Alexanderson, and comprises essentially an inductive winding and a pair of electric valves interconnecting the direct and alternating current circuits and means for successively rendering the valves alternately conducting and non-conducting. In case the alternating current circuit is not connected to an apparatus provided with a counter electromotive force it is also necessary to connect a commutating condenser between the electric valves. In apparatus of this type it has been found particularly advantageous to use valves of the vapor electric discharge type because of the relatively large amounts of power which may be handled at ordinary operating voltages. In the operation of such apparatus to supply an alternating current circuit having a counter electromotive force, such for example as alternating current synchronous or induction motors, it has been found impossible to supply loads drawing a lagging power factor without the use of an inordinate amount of commutating capacitance. Also in the operation of such apparatus utilizing a commutating capacitor it sometimes becomes difficult to even approximate unity power factor because under such conditions the commutating voltage of the capacitor is substantially zero.

It is an object of my invention to provide an improved electric power converting apparatus of the parallel inverter type and a method of operating the same which will overcome the above-mentioned disadvantages of the arrangements of the prior art and which will be simple, economical and reliable in operation.

It is a further object of my invention to provide an improved electric power converting apparatus of the parallel inverter type and a method of operating the same which is suitable for supplying alternating current loads having lagging power factors.

It is a further object of my invention to provide an improved electric power converting apparatus of the parallel inverter type provided with a commutating capacitor in which the maximum commutating voltage may be obtained even when supplying unity power factor or lagging power factor loads.

In acordance with one embodiment of my invention an electric power converting apparatus, for example, a parallel inverter comprising an inductive winding and a pair of electric valves interconnecting the direct and alternating current circuits, is provided with a commutating capacitor connected between the pair of electric valves through a second pair of electric valves reversely connected in parallel. Only one of the valves connected in series with the commutating capacitor is conductive at any given instant with a result that the capacitor is charged to its maximum commutating voltage and this voltage is held, by reason of the unilateral conductivity characteristics of the valve, until the other valve connected in series with the capacitor is made conducting, which occurs at the instant at which it is desired to commutate the load current between the main valves connected to the inductive winding. By means of such an arrangement it is posible to commutate the load current between the main valves at any desired instant in a cycle of alternating potential even against the counter-electromotive force of the load circuit.

For a better understanding of my invention together with other and further objects thereof reference is had to the following description taken in connection with the accompanying drawing and its scope will be pointed out in the appended claims. Fig. 1 of the accompanying drawing illustrates my invention as applied to an arrangement for transmitting energy from a direct current supply circuit to a single phase alternating current circuit while Fig. 2 represents an extension of my invention for supplying a polyphase alternating current load circuit.

Referring now to Fig. 1 of the drawing, I have illustrated an arrangement for transmitting energy from a direct current supply circuit 10 to an alternating current load circuit 11. This apparatus includes a transformer 12, the secondary winding of which is connected to the alternating current circuit 11 and the primary winding of which is provided with an electrical mid-point connected to the positive direct current line 10 through a smoothing reactor 13. The outer terminals of the primary winding of this transformer are connected to the negative direct current line 10 through a pair of electric valves 14 and 15. The electric valves 14 and 15 are each provided with an anode, a cathode and a control grid and may be of any of the several types well-known in the art although I prefer to use valves of the vapor electric discharge type. There is also provided a commutating capacitor 16 connected between the anodes of the valves 14 and 15 through a pair of electric valves 17 and 18 reversely connected in parallel; that is, with the anode of one valve connected to the cathode of the other. The valves 17 and 18 are each provided with an anode, a cathode and a control grid and are also preferably of the vapor electric discharge type. In order to energize the control grids of the several electric valves, there is provided a grid transformer 19 the primary winding of which is energized from the alternating current circuit of the apparatus through any suitable phase shifting arrangement. By way of example, I have illustrated the primary winding of the transformer 19 as connected across the primary winding of the transformer 12 through a phase shifting arrangement comprising a parallel connected resistor 20, variable reactor 21 and variable capacitor 22, although it will be apparent to those skilled in the art that any suitable phase shifting arrangement may be substituted therefor without departing from my invention. The control grids of the valves 14 and 15 are connected to the common cathode circuit through opposite halves of a secondary winding 23 of the transformer 19 and a current limiting resistor 24. Similarly the control grids of the valves 17 and 18 are connected to their respective cathodes through the secondary windings 26 and 27 of the transformer 19 and the current limiting resistors 28 and 29 respectively.

In explaining the operation of the above described apparatus, it will be assumed that the alternating current circuit 11 is connected to a load providing a sine wave of counter electromotive force. The general principle of operation of the apparatus, neglecting the action of the commutating capacitor 16, will be well understood by those skilled in the art. Assume for example, that the valve 14 is conducting during the half-cycle when the counter electromotive force of the left-hand portion of the primary winding of the transformer 12 is positive. During the same half-cycle the counter electromotive force of the right-hand portion of the primary winding of the transformer 12 is negative and, since current will always tend to flow through a path having the least positive counter electromotive force, the load current may be transferred to the valve 15 at any point in this half cycle by making this valve conducting. However, if the commutation of the current from the valve 14 to the valve 15 is delayed until the next half-cycle when the electromotive force has reversed polarity, it will be noted that the counter electromotive force of the left-hand half of the primary winding of the transformer 12 is negative with respect to that of the right-hand portion under which condition it is not ordinarily possible to commutate the current from the valve 14 to the valve 15 since the anode potential of the valve 14 is higher than that of valve 15. However, if the current is commutated from the valve 14 to the valve 15 while the counter electromotive force of the left-hand portion of the winding of the transformer 12 is positive, the current must lead the counter electromotive force, that is, the load circuit must have a leading power factor or else a capacitor must be connected across one of the windings of the transformer 12 to supply a wattless circulating KVA to provide for proper commutation. With the above described arrangement, however, it has been found possible to supply a load having a lagging power factor. In this arrangement, during the half cycle when the electric valve 14 is conducting, the electric valve 17 is also made conducting and the capacitor 16 becomes charged to the maximum potential of the primary winding of the transformer 12 which is approximately twice that of the direct current line. However, when the potential of the alternating current circuit passes the peak of the wave, the potential of the capacitor 16 does not decrease with it because of the unilateral conductivity characteristics of the valve 17. That is, the capacitor 16 becomes charged to substantially twice the potential of the direct current circuit and retains this charge until it is needed to commutate the current from the valve 14 to the valve 15. The secondary windings 27 and 23 of the grid transformer 19 are so connected that the valves 15 and 18 are rendered conductive at the same instant. Since the capacitor 16 is charged to approximately twice the potential of the direct current circuit, with its right-hand terminal positive, it will tend to discharge through the valves 15 and 14 in series, but, due to the unilateral conductivity characteristics of the valve 14, the result is merely the interruption of the current in this valve and its transfer to the valve 15 as will be well understood by those skilled in the art. In order to control the point in the cycle of the counter electromotive force at which the current is commutated between the valves 14 and 15, I have shown the primary winding of the grid transformer 19 connected across the alternating current circuit through a phase shifting circuit comprising a resistor 20, a variable reactor 21 and a variable capacitor 22. By properly adjusting these elements the grid potential may be made to either lead or lag the counter electromotive force of the circuit 11 and thus supply either leading or lagging current to the load.

In Fig. 2 I have illustrated an extension of my invention to an apparatus for transmitting energy from a direct current supply circuit 10 to a polyphase alternating current circuit 30, this apparatus comprising an inverter of the full wave type similar to that disclosed in United States Letter Patent No. 1,593,356, granted July 20, 1926, upon the application of David C. Prince. This apparatus comprises a transformer 31 provided with a three-phase primary winding 32 and a three-phase secondary winding 33. The several terminals of the primary winding 32 are connected to the positive direct current line 10 through the electric valves 34, 35 and 36 respectively, while these same terminals are connected to the negative direct current line through the electric valves 37, 38 and 39 respectively. Commutating capacitors 40, 41 and 42 are connected between the several adjacent pairs of valves through electric valves 43 and 44, 45 and 46, and 47 and 48 respectively. There is provided a grid transformer 150 with a plurality of secondary windings 49 for exciting the control grids of the several electric valves. The primary winding of this grid transformer, which is omitted for the sake of simplicity, is preferably energized from the alternating current circuit 30 through any suitable phase shifting arrangement for controlling the power factor of the load current.

The operation of this polyphase arrangement will be clear in view of the description of the apparatus shown in Fig. 1. Each of the capacitors 40, 41 and 42 is charged to the maximum potential of the alternating current circuit during the first 90° of one half cycle and this charge is retained on the capacitor until it is needed to commutate the current between the two valves between which it is connected. Assuming a counter-clockwise phase rotation, as indicated, the main electric valves will be coming in conducting in the order 35, 37, 36, 38, 34, 39, 35, each valve remaining conducting for 120 electrical degrees, and in the same cycle the valves associated with the commutating capacitors will be rendered conducting in the order 43, 48, 45, 44, 47 and 46.

While I have described what I at present consider preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:—

1. Apparatus for transmitting energy from a direct current supply circuit to an alternating current load circuit comprising a plurality of electric valves, means for controlling the conductivity of said valves, an inductive winding interconnecting said circuits through said valves, and means for commutating the load current between said valves at any desired point in the cycle of alternating potential comprising a commutating capacitor in circuit with certain of said valves and means for controlling the potential of said capacitor.

2. Apparatus for transmitting energy from a direct current supply circuit to an alternating current load circuit comprising a pair of electric valves, means for controlling the conductivity of said valves, an inductive winding interconnecting said circuits through said valves, a commutating capacitor, electric valve means connecting said capacitor between said first pair of valves, and means for controlling said valve means to commutate the load current between said pair of valves at any desired point in the cycle of alternating potential.

3. Apparatus for transmitting energy from a direct current supply circuit to an alternating current load circuit having a counter-electromotive force, comprising a pair of electric valves, an inductive winding interconnecting said circuits through said valves, a second pair of valves reversely connected in parallel, a commutating capacitor connected between said first pair of valves through said second pair of valves, and means for jointly controlling the conductivities of the several valves whereby current may be commutated between said first pair of valves at any desired point in the cycle of counter-electromotive force.

4. Apparatus for transmitting energy from a direct current supply circuit to an alternating current load circuit having a counter-electromotive force comprising a pair of electric valves, an inductive winding interconnecting said circuits through said valves, a second pair of valves reversely connected in parallel, a commutating capacitor connected between said first pair of valves through said second pair of valves, and means for similarly controlling the conductivity of each valve of one pair and a valve of the other pair whereby current may be commutated between said first pair of valves at any desired point in the cycle of counter-electromotive force.

5. Apparatus for transmitting energy from a direct current supply circuit to an alternating current load circuit having a counter-electromotive force comprising a pair of electric valves, an inductive winding interconnecting said circuits through said valves, a second pair of valves reversely connected in parallel, a commutating capacitor connected between said first pair of valves through said second pair of valves, and means for rendering conductive one valve of each pair for substantially 180° of the counter-electromotive force and for rendering conductive the other valves of said pairs for the other 180°.

6. Apparatus for transmitting energy from a direct current supply circuit to an alternating current load circuit comprising a pair of electric valves each provided with a control grid, an inductive winding interconnecting said circuits through said valves, a second pair of electric valves reversely connected in parallel and each provided with a control grid, a commutating capacitor connected between said first pair of valves through said second pair of valves, and means for similarly energizing the control grids of each valve of one pair and a valve of the other pair from said alternating current circuit.

7. Apparatus for transmitting energy from a direct current supply circuit to an alternating current load circuit comprising a pair of electric valves each provided with a control grid, an inductive winding interconnecting said circuits through said valves, a second pair of electric valves reversely connected in parallel and each provided with a control grid, a commutating capacitor connected between said first pair of valves through said second pair of valves, means for similarly energizing the control grids of each valve of one pair and a valve of the other pair with alternating potentials derived from said alternating current circuit, and means for shifting the phase of said grid potentials with respect to that of the alternating current circuit.

8. Apparatus for transmitting energy from a direct current supply circuit to an alternating current load circuit comprising a pair of electric valves each provided with a control grid, an inductive winding interconnecting said circuits through said valves, a second pair of valves reversely connected in parallel and each provided with a control grid, a commutating capacitor connected between said first pair of valves through said second pair of valves, a grid transformer provided with a plurality of secondary windings and energized from said alternating current circuit, connections from said secondary windings to the control grids of the several valves for exciting each valve of one pair and a valve of the other pair with an alternating potential of the same polarity, and means for shifting the phase of the grid potentials with respect to that of said alternating current circuit.

9. In combination, a direct current supply circuit, an alternating current load circuit and means for transmitting energy therebetween comprising a plurality of electric valves, means for controlling the conductivity of said valves, an inductive winding interconnecting said circuits through said valves, and means for commutating the load current between said valves at any desired point in the cycle of alternating potential comprising a commutating capacitor connected between certain of said valves and means for controlling the charging and discharging of said capacitor.

10. Apparatus for transmitting energy from a direct current supply circuit to a polyphase alternative current load circuit comprising a plurality of inductive windings connected in polyphase relation, an electric valve connected to each terminal of said inductive windings, means for controlling the conductivity of said valves, commutating capacitors connected between the valves associated with each pair of adjacent terminals, and means for controlling the charging and discharging of said capacitors to commutate the load current between said valves at any desired point in the cycle of alternating potential.

11. The method of transmitting energy from a direct current supply circuit to a lagging power factor alternating current load circuit by means of an apparatus including a pair of electric valves and means for commutating the load current therebetween which comprises controlling the conductivity of said valves and controlling the flow of current to and from said commutating means in such a manner as to transfer the load current between successive valves against the counter-electromotive force of the load circuit.

12. The method of transmitting energy from a direct current supply circuit to a lagging power factor alternating current load circuit by means of an apparatus including a pair of electric valves and a commutating capacitor connected therebetween which comprises controlling the conductivity of said valves and controlling the charging and discharging of said capacitor in such a manner as to transfer the load current between successive valves against the counter-electromotive force of the load circuit.

13. The method of transmitting energy from a direct current supply circuit to a lagging power factor alternating current load circuit by means of an apparatus including a pair of electric valves and a commutating capacitor connected therebetween which comprises controlling the conductivity of said valves, charging said capacitor to the maximum alternating potential and retaining the maximum charge on said capacitor until the instant of commutation, in order to transfer the load current between successive valves against the counter-electromotive force of the load circuit.

CLODIUS H. WILLIS.